(12) United States Patent
Liu et al.

(10) Patent No.: US 11,541,880 B2
(45) Date of Patent: Jan. 3, 2023

(54) INFORMATION PROCESSING METHOD, SERVER, AND INTELLIGENT MOBILE ROBOT

(71) Applicant: HUAWEI TECHNOLOGIES CO., LTD., Shenzhen (CN)

(72) Inventors: Zuqi Liu, Shenzhen (CN); Chao Ai, Shanghai (CN); Zhiguo Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/210,980

(22) Filed: Mar. 24, 2021

(65) Prior Publication Data

US 2021/0206367 A1    Jul. 8, 2021

Related U.S. Application Data

(63) Continuation of application No. PCT/CN2019/108045, filed on Sep. 26, 2019.

(30) Foreign Application Priority Data

Sep. 26, 2018 (CN) .......................... 201811124563.6

(51) Int. Cl.
| | |
|---|---|
| *B60Q 1/48* | (2006.01) |
| *B60W 30/06* | (2006.01) |
| *H04W 4/90* | (2018.01) |
| *B60W 60/00* | (2020.01) |
| *G08G 1/01* | (2006.01) |
| *G08G 1/14* | (2006.01) |

(52) U.S. Cl.
CPC ........ *B60W 30/06* (2013.01); *B60W 60/0016* (2020.02); *B60W 60/0021* (2020.02);
(Continued)

(58) Field of Classification Search
CPC ............. B60W 30/06; B60W 60/0016; B60W 60/0021; B60W 2556/50; G08G 1/0133;
(Continued)

(56) References Cited

U.S. PATENT DOCUMENTS

| | | | |
|---|---|---|---|
| 9,773,413 B1 * | 9/2017 | Li | ........................... G08G 1/146 |
| 10,656,645 B1 * | 5/2020 | Sturges | ................ G05D 1/0217 |

(Continued)

FOREIGN PATENT DOCUMENTS

| | | |
|---|---|---|
| CN | 101064065 A | 10/2007 |
| CN | 105043376 A | 11/2015 |

(Continued)

*Primary Examiner* — Anh V La
(74) *Attorney, Agent, or Firm* — Maier & Maier, PLLC

(57) ABSTRACT

An information processing method, a server, and an intelligent mobile robot, so that when the intelligent mobile robot encounters a danger, the intelligent mobile robot exchanges information with the server to achieve a purpose of escaping from a scene to a safe place. The method includes: receiving, by a server, a danger alarm sent by an intelligent mobile robot, where the danger alarm is used to indicate that the intelligent mobile robot detects a dangerous event; determining, by the server, a safe position for the intelligent mobile robot, where the safe position is a position in which the dangerous event does not occur currently; and sending, by the server, an escape instruction to the intelligent mobile robot, where the escape instruction includes the safe position.

20 Claims, 5 Drawing Sheets

(52) U.S. Cl.
CPC ............ *G08G 1/0133* (2013.01); *G08G 1/146* (2013.01); *H04W 4/90* (2018.02); *B60W 2556/50* (2020.02)

(58) Field of Classification Search
CPC .................. G08G 1/146; G08G 1/0112; G08G 1/096725; G08G 1/096805; G08G 1/096708; G08G 1/0968; H04W 4/90; H04W 4/44; H04W 4/02; H04L 67/12; B25J 9/1664; B25J 11/00; B25J 13/006
USPC ....... 340/932.2, 933, 937, 988, 686.1, 686.6
See application file for complete search history.

(56) References Cited

U.S. PATENT DOCUMENTS

| | | |
|---|---|---|
| 2011/0169647 A1 | 7/2011 | Morley |
| 2012/0215383 A1* | 8/2012 | Yoon ........................ H04N 7/18 701/2 |
| 2017/0059343 A1* | 3/2017 | Spinelli .................. G01C 21/20 |
| 2018/0114422 A1 | 4/2018 | Wiechers et al. |
| 2018/0201187 A1 | 7/2018 | Yellambalase et al. |
| 2018/0239359 A1* | 8/2018 | Jian ........................ G05D 1/0274 |
| 2020/0050206 A1* | 2/2020 | Deyle .................. G01S 13/881 |

FOREIGN PATENT DOCUMENTS

| | | |
|---|---|---|
| CN | 106043222 A | 10/2016 |
| CN | 205632352 U | 10/2016 |
| CN | 106504574 A | 3/2017 |
| CN | 106898153 A | 6/2017 |
| CN | 106920416 A | 7/2017 |
| CN | 107170276 A | 9/2017 |
| CN | 107845263 A | 3/2018 |
| CN | 108198448 A | 6/2018 |
| CN | 109448410 A | 3/2019 |
| JP | 2008051515 A | 3/2008 |
| WO | 2017/198696 A2 | 11/2017 |

\* cited by examiner

INFORMATION PROCESSING METHOD, SERVER, AND INTELLIGENT MOBILE ROBOT

CROSS-REFERENCE TO RELATED APPLICATIONS

This application is a continuation of International Application No. PCT/CN2019/108045, filed on Sep. 26, 2019, which claims priority to Chinese Patent Application No. 201811124563.6, filed on Sep. 26, 2018. The disclosures of the aforementioned applications are hereby incorporated by reference in their entireties.

TECHNICAL FIELD

The embodiments relate to the communications field, and in particular, to an information processing method, a server, and an intelligent mobile robot.

BACKGROUND

An intelligent mobile robot is a robot with embedded artificial intelligence and a mobility capability. The embedded artificial intelligence of the intelligent mobile robot may be implemented by an intelligent system including a sensor, a processor, a remote operator, and an automatic control mobile carrier. Through artificial intelligence, the intelligent mobile robot may have a plurality of functions, such as environment perception, dynamic decision-making and planning, and behavior control and execution. Due to the mobility capability of the intelligent mobile robot, the intelligent mobile robot has greater motility and flexibility than a general robot in work in a dangerous and harsh (such as radiation or toxic) environment and an environment (such as cosmic or underwater) that people cannot reach.

In some feasible embodiments, intelligent mobile robots may be categorized into a wheeled mobile robot (such as a self-driving car), a walking mobile robot (with one leg, two legs, or a plurality of legs), a tracked mobile robot, a crawling robot, a peristaltic robot, a flying robot (such as a self-flying unmanned aerial vehicle), a swimming robot, and the like according to a movement mode. The self-driving car is used as an example. The self-driving car may automatically plan a driving route, sense a road environment by using a vehicle-mounted sensing system, and control steering and a speed of the car according to road information, vehicle position information, and obstacle information that are obtained through the sensing, so that the car can drive safely and reliably on a road until a predetermined destination is reached.

Since the self-driving car goes on a road, more and more research has been made on self-driving, such as research from a perspective of artificial intelligence. At the same time, conventional car manufacturers and Internet companies have set up mobile service companies in succession to explore a passenger service of the self-driving car and provide a competitive mobile travel service. At present, the self-driving car may not only drive automatically, but also automatically search for a parking space, automatically search for a charging pile, automatically pick up people, or the like. However, in a case of fire or the like that may cause damage to the self-driving car, the self-driving car has no corresponding coping mechanism.

SUMMARY

Embodiments provide an information processing method, a server, and an intelligent mobile robot, so that when the intelligent mobile robot encounters a danger, the intelligent mobile robot exchanges information with the server to achieve a purpose of escaping from a scene to a safe place.

A first aspect provides an information processing method, including:

After receiving a danger alarm sent by an intelligent mobile robot, where the danger alarm is used to indicate that the intelligent mobile robot detects a dangerous event, a server determines a safe position for the intelligent mobile robot, where the safe position is a position in which the dangerous event does not occur currently. Then, the server sends an escape instruction to the intelligent mobile robot, where the escape instruction includes the safe position. Therefore, the intelligent mobile robot may drive to the safe position according to the escape instruction, so as to stay away from the dangerous event and reduce a risk of being damaged.

A self-driving car is used as an example. When the self-driving car encounters a dangerous event, for example, the self-driving car encounters fire, flood, or an earthquake when parked in a parking lot, the self-driving car may send a danger alarm to the server. After receiving the danger alarm sent by the self-driving car, the server may first search for a safe position in which the dangerous event does not occur, for example, determine an available parking space in another parking lot as the safe position, and return an escape instruction including the safe position to the self-driving car. The self-driving car may determine a driving route to the safe position by using a navigation function, and follow the driving route to drive to the safe position.

In some embodiments, before the server receives the danger alarm sent by the intelligent mobile robot, the method further includes the following.

The server receives a current position of the intelligent mobile robot sent by the intelligent mobile robot, where the escape instruction further includes an escape route, and the escape route is used to indicate a driving route from the current position to the safe position to the intelligent mobile robot. Based on a definite driving route, the intelligent mobile robot may follow the driving route to drive to the safe position, so as to escape from a danger.

In this embodiment, when the intelligent mobile robot is in a driving state, the current position of the intelligent mobile robot may change over time. If the intelligent mobile robot periodically sends information about the current position of the intelligent mobile robot to the server, the server may periodically obtain a latest current position of the intelligent mobile robot. If a period is 1 second or 0.1 seconds, it may be considered that the server obtains the latest current position of the intelligent mobile robot "at any time".

In some embodiments, the method is applicable to a wide range. The intelligent mobile robot includes a self-driving car and a self-flying unmanned aerial vehicle. The self-driving car is also known as a driverless car, a computer-driven car, or a wheeled mobile robot, and is a driverless intelligent car implemented based on artificial intelligence. The self-driving car may drive automatically and safely without any active human operation. The self-piloting unmanned aerial vehicle is one type of unmanned aerial vehicle. The self-piloting unmanned aerial vehicle may be remotely controlled or may perform self-piloting. As long as an unmanned aerial vehicle has a self-piloting function, the unmanned aerial vehicle may be called the self-piloting unmanned aerial vehicle.

In some embodiments, if the intelligent mobile robot is the self-driving car, the server may determine the safe position for the intelligent mobile robot according to a parking space information base, where the parking space information base includes at least one parking space and usage of each of the at least one parking space, the usage is unused or used, and the safe position is a parking space whose usage is unused in the parking space information base. Based on the parking space information base and management of the parking space information base, the safe position is determined, so that the intelligent mobile robot may drive to the safe position when encountering a danger.

In some embodiments, the safe position may be a suburb or a parking space in a parking lot and is not limited herein. A case in which the safe position is a parking space in a parking lot is used as an example. In some embodiments, the server may determine, from the parking space information base, a parking space whose usage is unused in a parking lot with no dangerous event as the safe position. For example, the parking space information base includes at least one parking space and usage of each of the at least one parking space, and the usage is unused or used. Therefore, the server may first obtain a set of unused parking spaces according to a parking space whose usage is unused in the parking space information base. If the set of unused parking spaces includes not less than one parking space, the server determines one parking space from the set of unused parking spaces as the safe position. In some embodiments, if the set of unused parking spaces includes less than one parking space, the server may wait for a preset time until the set of unused parking spaces includes not less than one parking space or determine the safe position in another manner. This is not limited herein.

Thus, the server determines, according to the parking space information base, a parking space whose usage is unused, to obtain a set of unused parking spaces. If the set of unused parking spaces includes not less than one parking space, the server determines one parking space from the set of unused parking spaces as the safe position.

In some embodiments, if the set of unused parking spaces includes more than one parking space, the server separately calculates a distance from the current position to each parking space in the set of unused parking spaces and determines a parking space with a shortest distance from the current position in the set of unused parking spaces as the safe position. The safe position may be effectively determined based on the distance between the current position and the parking space.

In some embodiments, the distance is a linear distance or a driving distance, the linear distance is a length of a line segment with the two positions as endpoints, and the driving distance is a distance of a driving route of the intelligent mobile robot between the two positions.

In some embodiments, if the set of unused parking spaces includes more than one parking space, the server obtains a current traffic situation, calculates, according to the current traffic situation, a time length used for driving from the current position to each parking space in the set of unused parking spaces, and determines a parking space with a shortest time length used for driving from the current position to the parking space as the safe position. The safe position may be effectively determined based on the time length of driving between the current position and the parking space.

In some embodiments, after the server sends the escape instruction to the intelligent mobile robot, the method further includes: the server changes, in the parking space information base, usage of the safe position to used. Therefore, the parking space information base may be updated in a timely manner, so that the parking space information base provides more accurate information and better use experience.

In some embodiments, after the server receives the current position of the intelligent mobile robot sent by the intelligent mobile robot, the method further includes: if the current position is a parking space in the parking space information base, the server uses the current position to update the parking space information base, so that the updated parking space information base indicates that usage of the parking space corresponding to the current position is used. Therefore, the parking space information base may be updated in a timely manner, so that the parking space information base provides more accurate information and better use experience.

In some embodiments, the safe position is a parking space in a parking lot, and/or the current position is a parking space in a parking lot.

In some embodiments, the dangerous event includes a fire event, a flood event, and an earthquake event.

A second aspect provides an information processing method, including the following.

An intelligent mobile robot detects an ambient environment to determine whether a dangerous event occurs. The intelligent mobile robot sends a danger alarm to a server when determining that the dangerous event occurs, where the danger alarm is used to indicate that the intelligent mobile robot detects the dangerous event, so that the server determines a safe position for the intelligent mobile robot, where the safe position is a position in which the dangerous event does not occur currently. The intelligent mobile robot receives an escape instruction sent by the server, where the escape instruction includes the safe position. Therefore, the intelligent mobile robot may drive to the safe position according to the escape instruction, so as to stay away from the dangerous event and reduce a risk of being damaged.

In some embodiments, after the intelligent mobile robot receives the escape instruction sent by the server, the method further includes: the intelligent mobile robot drives to the safe position according to the escape instruction, so as to stay away from the dangerous event and reduce a risk of being damaged.

In some embodiments, before the intelligent mobile robot sends the danger alarm to the server, the method further includes: the intelligent mobile robot sends a current position of the intelligent mobile robot to the server, where the escape instruction further includes an escape route, and the escape route is used to indicate a driving route from the current position to the safe position to the intelligent mobile robot. Based on a definite driving route, the intelligent mobile robot may follow the driving route to drive to the safe position, so as to escape from a danger.

In some embodiments, the intelligent mobile robot includes a self-driving car and a self-flying unmanned aerial vehicle. If the intelligent mobile robot is the self-driving car, the safe position is a parking space in a parking lot, and/or the current position is a parking space in a parking lot. The dangerous event includes a fire event, a flood event, and an earthquake event.

In some embodiments, that the intelligent mobile robot detects the ambient environment to determine whether the dangerous event occurs includes: the intelligent mobile robot detects the ambient environment by using an infrared sensor and/or a smoke sensor, to determine whether the fire event occurs; the intelligent mobile robot detects the ambient environment by using a water surface contact sensor, to determine whether the flood event occurs; and/or the intelligent mobile robot detects the ambient environment by using an angle sensor, to determine whether the earthquake event occurs, so as to determine a method for detecting different dangerous events.

In some embodiments, the intelligent mobile robot detects the ambient environment by using a water surface contact sensor, to determine whether the flood event occurs. In some embodiments, a water surface contact sensor may be built in a car and is configured to turn off an engine or another component when water flows into the car, to prevent further damage. In some embodiments, the water surface contact sensor may be built in the intelligent mobile robot. When the intelligent mobile robot senses water inflow by using the water surface contact sensor, and a degree of the water inflow reaches a specific degree, occurrence of flood may be determined. It should be noted that the flood may be caused by a rainstorm, floodwater, a dike burst, or another reason, and details are not described herein.

In some embodiments, the intelligent mobile robot detects the ambient environment by using an angle sensor, to determine whether the earthquake event occurs. In this embodiment, the angle sensor such as a gyroscope may detect whether consistent shaking occurs in a current environment. If a degree of the shaking reaches a specific degree, occurrence of the earthquake event may be determined. It should be noted that the occurrence of the earthquake event has a process from a mild degree to a severe degree. When there is a mild earthquake such as a magnitude 2 earthquake, no damage is caused to a car body. When the earthquake reaches a degree of an earthquake disaster, damage may be caused to the car body. Therefore, in the process, there may be enough time to escape from a scene.

In some embodiments, the intelligent mobile robot may further receive a disaster warning by using a wireless network. When receiving the disaster warning, the intelligent mobile robot determines that a dangerous event occurs, and sends a danger alarm to the server. A manner is not limited herein, as long as the manner may be used to determine that the dangerous event occurs in the ambient environment.

A third aspect provides a server, including:

a transceiver module, configured to receive a danger alarm sent by an intelligent mobile robot, where the danger alarm is used to indicate that the intelligent mobile robot detects a dangerous event; and a processing module, configured to determine a safe position for the intelligent mobile robot, where the safe position is a position in which the dangerous event does not occur currently, and the transceiver module is further configured to send an escape instruction to the intelligent mobile robot, where the escape instruction includes the safe position. The intelligent mobile robot may drive to the safe position according to the escape instruction. Therefore, the intelligent mobile robot may stay away from the dangerous event and reduce a risk of being damaged.

In some embodiments, the transceiver module is further configured to receive a current position of the intelligent mobile robot sent by the intelligent mobile robot. The escape instruction further includes an escape route, and the escape route is used to indicate a driving route from the current position to the safe position to the intelligent mobile robot. Because there is a definite driving route, the intelligent mobile robot may follow the driving route to drive to the safe position, so as to escape from a danger.

In some embodiments, the processing module is configured to:

if the intelligent mobile robot is a self-driving car, determine the safe position for the intelligent mobile robot according to a parking space information base, where the parking space information base includes at least one parking space and usage of each of the at least one parking space, the usage is unused or used, and the safe position is a parking space whose usage is unused in the parking space information base. Due to obtaining of the parking space information base and management of the parking space information base, the safe position is determined, so that the intelligent mobile robot may drive to the safe position when encountering a danger.

In some embodiments, in a step of determining the safe position for the intelligent mobile robot according to the parking space information base, the processing module performs at least the following steps:

determining, according to the parking space information base, a parking space whose usage is unused, to obtain a set of unused parking spaces; and if the set of unused parking spaces includes not less than one parking space, determining one parking space from the set of unused parking spaces as the safe position.

In some embodiments, in a step of determining one parking space from the set of unused parking spaces as the safe position, the processing module performs at least the following steps:

if the set of unused parking spaces includes more than one parking space, separately calculating a distance from the current position to each parking space in the set of unused parking spaces; and determining a parking space with a shortest distance from the current position in the set of unused parking spaces as the safe position. The safe position may be effectively determined based on the distance between the current position and the parking space.

In some embodiments, in a step of determining one parking space from the set of unused parking spaces as the safe position, the processing module performs at least the following steps:

obtaining a current traffic situation if the set of unused parking spaces includes more than one parking space; calculating, according to the current traffic situation, a time length used for driving from the current position to each parking space in the set of unused parking spaces; and determining a parking space with a shortest time length used for driving from the current position to the parking space as the safe position. The safe position may be effectively determined based on the time length of driving between the current position and the parking space.

In some embodiments, the processing module is further configured to change, in the parking space information base, usage of the safe position to used. Therefore, the parking space information base may be updated in a timely manner, so that the parking space information base provides more accurate information and better use experience.

In some embodiments, the processing module is further configured to: if the current position is a parking space in the parking space information base, use the current position to update the parking space information base, so that the updated parking space information base indicates that usage of the parking space corresponding to the current position is used. Therefore, the parking space information base may be updated in a timely manner, so that the parking space information base provides more accurate information and better use experience.

A fourth aspect provides an intelligent mobile robot, including:

a detection module, configured to detect an ambient environment to determine whether a dangerous event occurs; and a transceiver module, configured to send a danger alarm to a server when that the dangerous event occurs is determined, where the danger alarm is used to indicate that the detection module detects the dangerous event, so that the server determines a safe position for the intelligent mobile robot, where the safe position is a position in which the dangerous event does not occur currently. The transceiver module is further configured to receive an escape instruction sent by the server, where the escape instruction includes the safe position. Therefore, the intelligent mobile robot may drive to the safe position according to the escape instruction, so as to stay away from the dangerous event and reduce a risk of being damaged.

In some embodiments, the intelligent mobile robot further includes:

a self-driving module, configured to drive to the safe position according to the escape instruction, so as to stay away from the dangerous event and reduce a risk of being damaged.

In some embodiments, the transceiver module is further configured to send a current position of the intelligent mobile robot to the server. The escape instruction further includes an escape route, and the escape route is used to indicate a driving route from the current position to the safe position to the intelligent mobile robot. Based on a definite driving route, the intelligent mobile robot may follow the driving route to drive to the safe position, so as to escape from a danger.

In some embodiments, the detection module is configured to:

detect the ambient environment by using an infrared sensor and/or a smoke sensor, to determine whether a fire event occurs;

detect the ambient environment by using a water surface contact sensor, to determine whether a flood event occurs; and/or detect the ambient environment by using an angle sensor, to determine whether an earthquake event occurs.

In some embodiments, that the intelligent mobile robot detects the ambient environment to determine whether the dangerous event occurs includes: the intelligent mobile robot detects the ambient environment by using an infrared sensor and/or a smoke sensor, to determine whether the fire event occurs; the intelligent mobile robot detects the ambient environment by using a water surface contact sensor, to determine whether the flood event occurs; and/or the intelligent mobile robot detects the ambient environment by using an angle sensor, to determine whether the earthquake event occurs, so as to determine a method for detecting different dangerous events.

In some embodiments, the intelligent mobile robot detects the ambient environment by using a water surface contact sensor, to determine whether the flood event occurs. In some embodiments, a water surface contact sensor may be built in a car and is configured to turn off an engine or another component when water flows into the car, to prevent further damage. In some embodiments, the water surface contact sensor may be built in the intelligent mobile robot. When the intelligent mobile robot senses water inflow by using the water surface contact sensor, and a degree of the water inflow reaches a specific degree, occurrence of flood may be determined. It should be noted that the flood may be caused by a rainstorm, floodwater, a dike burst, or another reason, and details are not described herein.

In some embodiments, the intelligent mobile robot detects the ambient environment by using an angle sensor, to determine whether the earthquake event occurs. In this embodiment, the angle sensor such as a gyroscope may detect whether consistent shaking occurs in a current environment. If a degree of the shaking reaches a specific degree, occurrence of the earthquake event may be determined. It should be noted that the occurrence of the earthquake event has a process from a mild degree to a severe degree. When there is a mild earthquake such as a magnitude 2 earthquake, no damage is caused to a car body. When the earthquake reaches a degree of an earthquake disaster, damage may be caused to the car body. Therefore, in the process, there may be enough time to escape from a scene.

In some embodiments, the intelligent mobile robot may further receive a disaster warning by using a wireless network. When receiving the disaster warning, the intelligent mobile robot determines that a dangerous event occurs, and sends a danger alarm to the server. A manner is not limited herein, as long as the manner may be used to determine that the dangerous event occurs in the ambient environment.

A fifth aspect provides a server, including a transceiver, a processor, and a memory.

The transceiver is configured to receive a danger alarm sent by an intelligent mobile robot, where the danger alarm is used to indicate that the intelligent mobile robot detects a dangerous event.

The memory is configured to store a program, and the processor calls the program stored in the memory, to determine a safe position for the intelligent mobile robot, where the safe position is a position in which the dangerous event does not occur currently.

The transceiver is further configured to send an escape instruction to the intelligent mobile robot, where the escape instruction includes the safe position.

A sixth aspect provides an intelligent mobile robot, including a transceiver, a processor, and a memory.

The memory is configured to store a program, and the processor calls the program stored in the memory, to detect an ambient environment to determine whether a dangerous event occurs. The transceiver is configured to send a danger alarm to a server when that the dangerous event occurs is determined, where the danger alarm is used to indicate that the intelligent mobile robot detects the dangerous event, so that the server determines a safe position for the intelligent mobile robot, where the safe position is a position in which the dangerous event does not occur currently; and receive an escape instruction sent by the server, where the escape instruction includes the safe position.

A seventh aspect provides a computer readable storage medium, the computer readable storage medium stores an instruction, and when the instruction runs on a computer, the computer is enabled to perform the information processing method according to any one of the first aspect or the possible implementations of the first aspect.

An eighth aspect provides a computer readable storage medium, the computer readable storage medium stores an instruction, and when the instruction runs on a computer, the computer is enabled to perform the information processing method according to any one of the second aspect or the possible implementations of the second aspect.

A ninth aspect of the embodiments provides a chip system. The chip system includes a processor, configured to support a server in implementing a function in any one of the first aspect or the possible implementations of the first aspect. In a possible implementation, the chip system further includes a memory, and the memory is configured to store a program instruction and data that are necessary for an execution function network element. The chip system may include a chip, or may include a chip and other discrete components.

A tenth aspect of the embodiments provides a chip system. The chip system includes a processor, configured to support an intelligent mobile robot in implementing a function in any one of the second aspect or the possible implementations of the second aspect. In a possible implementation, the chip system further includes a memory, and the memory is configured to store a program instruction and data that are necessary for a control function network element. The chip system may include a chip, or may include a chip and other discrete components.

It can be seen from the foregoing solutions that the embodiments have at least the following advantages.

When the dangerous event occurs, the intelligent mobile robot may send the danger alarm to the server. The server may determine, for the intelligent mobile robot, the safe position in which the dangerous event does not occur currently, and send the escape instruction including the safe position to the intelligent mobile robot. Therefore, the intelligent mobile robot may drive to the safe position according to the escape instruction, so as to stay away from the dangerous event and reduce a risk of being damaged.

BRIEF DESCRIPTION OF DRAWINGS

FIG. 3-1 is a schematic diagram of an information processing method according to another embodiment;
FIG. 3-2 is a schematic diagram of a driving route according to an embodiment.

DETAILED DESCRIPTION OF THE EMBODIMENTS

Figure 1:
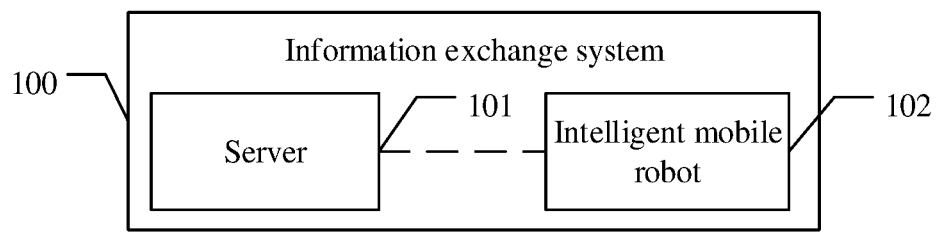
FIG. 1 is a schematic diagram of an information exchange system according to an embodiment.

Embodiments provide an information processing method, a server, and an intelligent mobile robot, so that when the intelligent mobile robot encounters a danger, the intelligent mobile robot exchanges information with the server to achieve a purpose of escaping from a scene to a safe place.

To make persons of ordinary skill in the art understand the solutions in the embodiments better, the following clearly describes the solutions in the embodiments with reference to the accompanying drawings in the embodiments. Apparently, the described embodiments are merely some, but not all, of the embodiments.

The terms "first", "second", "third", "fourth", and so on (if existent) are intended to distinguish between similar objects but do not necessarily indicate a specific order or sequence. It should be understood that the data termed in such a way are interchangeable in proper circumstances so that the implementations described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

In the embodiments, an intelligent mobile robot is a robot with embedded artificial intelligence and a mobility capability. The embedded artificial intelligence of the intelligent mobile robot may be implemented by an intelligent system including a sensor, a processor, a remote operator, and an automatic control mobile carrier. Through artificial intelligence, the intelligent mobile robot may have a plurality of functions, such as environment perception, dynamic decision-making and planning, behavior control, and task execution. In addition, by using the mobility capability, the intelligent mobile robot may replace people to work in a dangerous and harsh (such as radiation or toxic) environment or an environment (such as cosmic or underwater) that people cannot reach. With the development of artificial intelligence, an application range of the intelligent mobile robot is greatly expanded. The intelligent mobile robot is not only widely used in industry, agriculture, medical treatment, service, and other fields, but also well used in urban security, national defense, space exploration, and other harmful and dangerous occasions.

Intelligent mobile robots may be categorized into a wheeled mobile robot (such as a self-driving car), a walking mobile robot (with one leg, two legs, or a plurality of legs), a tracked mobile robot, a crawling robot, a peristaltic robot, a flying robot (such as a self-flying unmanned aerial vehicle), a swimming robot, and the like according to a movement mode.

At present, more and more research is made on the intelligent mobile robot in various aspects, such as research from a perspective of artificial intelligence. The self-driving car is used as an example. The self-driving car is also known as a driverless car, a computer-driven car, or a wheeled mobile robot, and is a driverless intelligent car implemented based on artificial intelligence. The self-driving car may drive automatically and safely without any active human operation. At present, conventional car manufacturers and Internet companies have set up mobile service companies in succession to explore a passenger service of the self-driving car and provide a competitive mobile travel service, so that a plurality of functions of the self-driving car are implemented. The self-driving car may not only drive automatically, but also automatically search for a parking space, automatically search for a charging pile, automatically pick up people, or the like.

The self-driving car may complete an established task through artificial intelligence. However, in a case of fire or the like that may cause damage to the self-driving car, the self-driving car has no corresponding coping mechanism. For example, when encountering a fire event in a parking lot, the self-driving car has no corresponding coping mechanism, and this may cause some damage to the self-driving car.

In the embodiments, when a dangerous event occurs, the intelligent mobile robot may send a danger alarm to the server, so that the server determines, for the intelligent mobile robot, a safe position in which the dangerous event does not occur currently, and sends an escape instruction including the safe position to the intelligent mobile robot.

Therefore, the intelligent mobile robot may drive to the safe position according to the escape instruction, so as to stay away from the dangerous event and reduce a risk of being damaged.

The self-driving car is used as an example. When the self-driving car encounters a dangerous event, for example, the self-driving car encounters fire, flood, or an earthquake when parked in a parking lot, the self-driving car may send a danger alarm to the server. After receiving the danger alarm sent by the self-driving car, the server may first search for a safe position in which the dangerous event does not occur, for example, determine an available parking space in another parking lot as the safe position, and return an escape instruction including the safe position to the self-driving car. The self-driving car may determine a driving route to the safe position by using a navigation function, and follow the driving route to drive to the safe position.

An example in which the intelligent mobile robot is a self-piloting unmanned aerial vehicle is used for description. The self-piloting unmanned aerial vehicle is one type of unmanned aerial vehicle. The self-piloting unmanned aerial vehicle may be remotely controlled or may perform self-piloting. As long as an unmanned aerial vehicle has a self-piloting function, the unmanned aerial vehicle may be called the self-piloting unmanned aerial vehicle. In some scenarios, for example, in a private park or in a living or research and development park of a manufacturer of the self-piloting unmanned aerial vehicle, the self-piloting unmanned aerial vehicle may implement automatic flight, task execution, and automatic returning, to return to a dedicated or public position such as a rechargeable storage cabinet and implement automatic connection and charging. When the self-piloting unmanned aerial vehicle encounters a dangerous event such as fire, no power, or partial damage during task execution, the self-piloting unmanned aerial vehicle may automatically return to the storage cabinet for charging, waiting to be repaired, or waiting for a next task. In some embodiments, if the self-piloting unmanned aerial vehicle encounters a dangerous event in the storage cabinet, the self-piloting unmanned aerial vehicle may also send a danger alarm to the server. In this case, the server may arrange another storage cabinet for the self-piloting unmanned aerial vehicle as a safe position, so that the self-piloting unmanned aerial vehicle may fly to the safe position.

Due to a wide variety of intelligent mobile robots, no exhaustive enumeration is provided herein.

FIG. 1 is an information exchange system 100, including a server 101 and an intelligent mobile robot 102. A communication connection between the server 101 and the intelligent mobile robot 102 is implemented by using a wireless network.

In an embodiment, the server 101 may include one or more central processing units (CPU) (for example, one or more processors) and a memory, and one or more storage media for storing an application program or data (for example, one or more mass storage devices). The memory and the storage medium may be transient storage or persistent storage. The program stored in the storage medium may include one or more modules, and each module may include a series of instruction operations for the server 101. Further, the central processing unit may be configured to communicate with the storage medium, to perform, on the server 101, a series of instruction operations in the storage medium. In some embodiments, the server 101 may further include one or more power supplies, one or more wired or wireless network interfaces, one or more input/output interfaces, and/or one or more operating systems such as Windows Server™, Mac OS X™, Unix™, Linux™, or FreeBSD™, which is not limited herein.

In some embodiments, the server 101 may be a cloud server. The so-called cloud server is a server using a cloud technology. In the cloud technology, a software platform integrating a plurality of functions such as software search, download, use, management, and backup is used to encapsulate various types of commonly used software in an independent virtualized environment, so that application software is not coupled with a system, so as to achieve a purpose of using the software without installation. In some embodiments, the server 101 may be alternatively another type of server, which is not limited herein.

In this embodiment, a positioning and navigation module (such as a global positioning and navigation system/Beidou navigation satellite system/Galileo navigation satellite system/GLONASS navigation system), a vision module, a radar module, a calculation module, a battery module, and a wireless module may be built in the intelligent mobile robot 102. One or more of the foregoing modules may be built in the intelligent mobile robot 102 as required, and more modules may also be included. This is not limited herein. The positioning and navigation module may implement precise positioning of the intelligent mobile robot 102, including a static or moving position of the intelligent mobile robot 102. The vision module refers to a single-camera, two-camera, or multi-camera vision system of the intelligent mobile robot 102, and is configured to identify an ambient environmental element of the intelligent mobile robot 102. The radar module refers to millimeter wave radar and laser radar of the intelligent mobile robot 102, and is configured to identify an obstacle around the intelligent mobile robot 102. The calculation module refers to a calculation unit of the intelligent mobile robot 102, and is configured to integrate data of the vision module, the radar module, and the positioning and navigation module, and guide driving of the intelligent mobile robot 102. The battery module refers to a power system of the intelligent mobile robot 102, or may be a replacement of a power system of an internal combustion engine, and is not limited herein. The wireless module refers to a data transmission channel for the server 101 and the intelligent mobile robot 102.

By using the foregoing plurality of modules, the intelligent mobile robot 102 may obtain corresponding data of a surrounding traffic situation and upload the corresponding data to the server 101, so that the server 101 may process a large amount of information about surrounding terrain and return related information or a related instruction to the intelligent mobile robot 102. The intelligent mobile robot 102 safely drives according to the related information or the related instruction. Due to data processing by the server 101, a driving mode of the intelligent mobile robot 102 may reduce an incidence of a traffic accident and make a driving process safer.

It should be noted that different types of intelligent mobile robots may have one or more of the foregoing functions that the intelligent mobile robot 102 has, and may further have another special function. For example, a self-flying unmanned aerial vehicle has a capability of flying. This is not limited herein.

Figure 2:
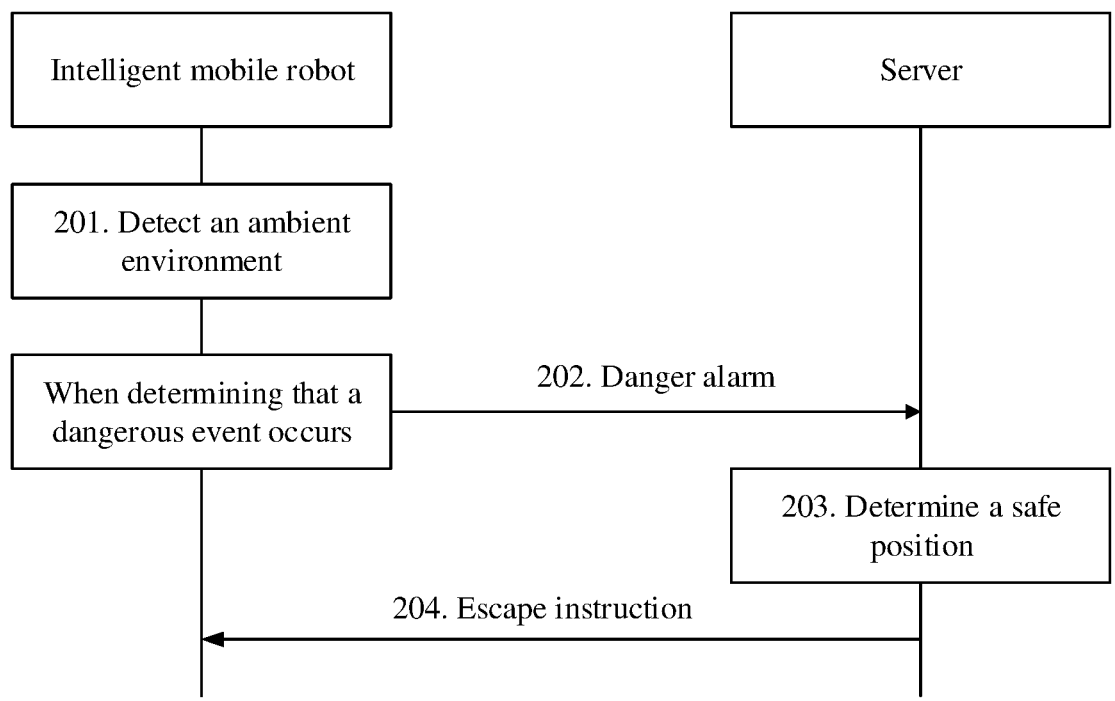
FIG. 2 is a schematic diagram of an information processing method according to an embodiment.

Referring to FIG. 2, an embodiment provides an information processing method, including:

201. An intelligent mobile robot detects an ambient environment to determine whether a dangerous event occurs.

202. The intelligent mobile robot sends a danger alarm to a server when determining that the dangerous event occurs, where the danger alarm is used to indicate that the intelligent mobile robot detects the dangerous event.

203. The server determines a safe position for the intelligent mobile robot, where the safe position is a position in which the dangerous event does not occur currently.

204. The server sends an escape instruction to the intelligent mobile robot, where the escape instruction includes the safe position.

In this embodiment, when the dangerous event occurs, the intelligent mobile robot may send the danger alarm to the server. The server may determine, for the intelligent mobile robot, the safe position in which the dangerous event does not occur currently, and send the escape instruction including the safe position to the intelligent mobile robot. Therefore, the intelligent mobile robot may drive to the safe position according to the escape instruction, so as to stay away from the dangerous event and reduce a risk of being damaged.

Figures 1, 3:
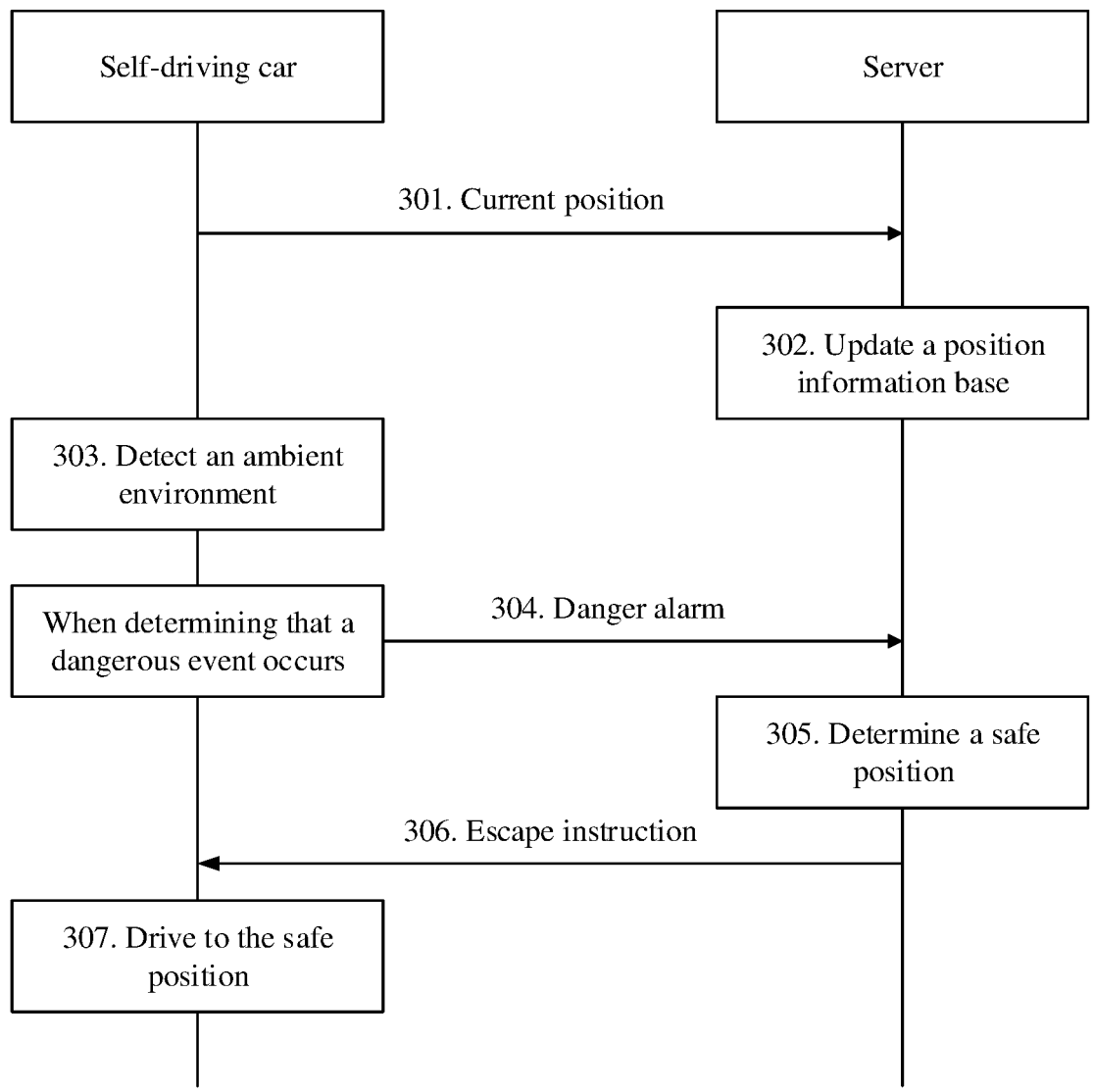
Figures 2, 3:
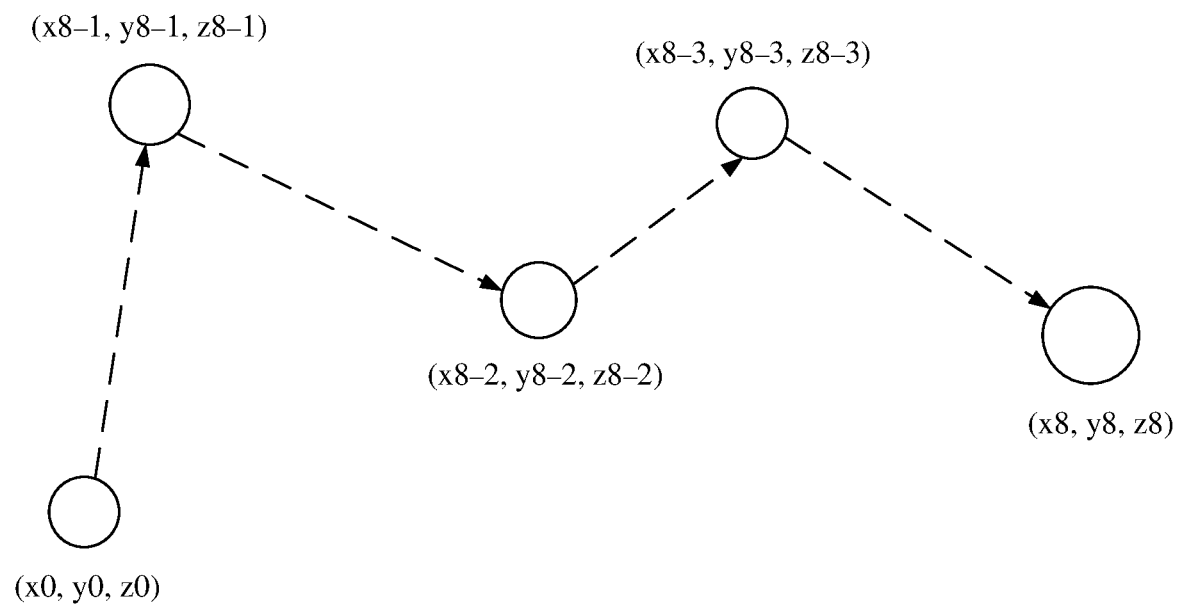

An example in which the intelligent mobile robot is a self-driving car is used. Referring to FIG. 3-1, an embodiment provides an information processing method, including:

301. The self-driving car sends a current position of the self-driving car to a server.

In this embodiment, when the self-driving car is in a driving state, the current position of the self-driving car changes over time. If the self-driving car periodically sends the current position of the self-driving car to the server, the server may periodically obtain a latest current position of the self-driving car. If a period is 1 second or 0.1 seconds, the server may obtain the latest current position of the self-driving car at any time.

In this embodiment, there are two states for the self-driving car: the driving state and a parking state. The driving state is a state in which a driving mode of the self-driving car is turned on, a motor is started by using a built-in power system (such as electricity or gasoline), and a motion vision system or the like makes the self-driving car move relative to the ground as a reference, for example, drive on a road or a mountain road.

In some embodiments, when the self-driving car is driving on the road, the self-driving car stops in front of a traffic light due to a red light. The driving mode is turned on, that is, the motor is started, and the vision system or the like is used, and the self-driving car stops in front of the red light just to comply with a traffic rule. Therefore, the self-driving car may be understood as being still in the driving state.

In some embodiments, whether the self-driving car is in the driving state is determined according to a specific situation and different definitions. For example, the self-driving car is loaded on a truck, and the truck is driving on a road. For example, the self-driving car is towed away by a trailer due to violation of a parking regulation or damage. This is not limited herein.

In this embodiment, the parking state may be parking in a parking space in a parking lot, parking in a private parking space, parking in a private garage, or another non-driving state, which is not limited herein.

In some embodiments, the current position of the self-driving car may be expressed by using coordinates, such as coordinates using the earth as a reference system. For example, if the coordinates use the earth as the reference system, coordinates (x, y, z) of any position on the earth may be obtained by using a longitude as an x-axis (for example, a positive direction is north), a latitude as a y-axis (for example, a positive direction is east), a gravity direction as a z-axis (for example, a positive direction is up), and a point on a surface of the earth or a core of the earth as a zero point.

In some embodiments, the coordinates may alternatively use a city, a province, or a country as the reference system, and coordinates of any position in the city, the province, or the country, for example, city A (x, y, z), may be obtained by using a longitude as an x-axis, a latitude as a y-axis, a gravity direction as a z-axis, and a point (such as a city government) in the city, the province, or the country as a zero point. In some embodiments, the coordinates may be alternatively expressed in another manner, which is not limited herein.

Referring to Table 1, an example is used below for description.

TABLE 1

| Car number | Coordinates |
| --- | --- |
| 001 | (x1, y1, z1) |

As shown in Table 1, coordinates of a car whose car number is 001 are (x1, y1, z1).

In some embodiments, the coordinates of the current position of the self-driving car may be coordinates of a position of a component in a positioning system (such as a GPS or another positioning system) on the self-driving car. For example, a locator, which may be placed on the front or rear of the car, sends a positioning signal to the server. In some embodiments, the locator may be further used to determine a space occupied by a parking position of the self-driving car. If a positive direction of the locator is preset to a car front direction, an opposite of the car front direction is a car rear direction, a direction obtained after a counter-clockwise rotation by 90° from the car front direction is left, a direction obtained after a clockwise rotation by 90° from the car front direction is right, a gravity direction is down, and an opposite of the gravity direction is up. When receiving the coordinates of the current position, the server may determine a space with a volume or an area that is obtained by moving the coordinates by preset distances in the car front direction, the car rear direction, left, right, up, and down respectively, as a position of a parking space. For example, coordinates obtained by the locator of the self-driving car are (x1, y1, z1), the locator is placed in a center of the car, and the positive direction of the x-axis is the car front direction. Assume that a distance between the locator and either of the front and the rear of the car is 1.5 meters, a distance between the locator and either of a left door and a right door is 0.6 meters, and a distance between the locator and either of the top and the bottom of the car is 0.7 meters. In this case, the position of the self-driving car is determined as $\{(x, y, z)|x1-1.5<x<x1+1.5, y1-0.6<y<y1+0.6, z1-0.7<z<z1-0.7\}$, which is a space with a volume. In some embodiments, coordinates of a parking space may be alternatively expressed in another manner, which is not limited herein.

In some embodiments, when the self-driving car is in the parking state, if the self-driving car is parked in a parking space in a parking lot, the current position is the parking space in the parking lot, and the self-driving car may send the parking space in the parking lot to the server as the current position. For example, an expression method of the parking space is information such as a parking lot name, a parking lot address, a parking lot zone, a floor, a row number, a column number, and a parking space number, which is not limited herein. It should be noted that the parking space in the parking lot may correspond to coordinates, so that the parking space may be expressed by using the coordinates. This is not limited herein.

Referring to Table 2, an example is used below for description.

TABLE 2

| Parking space number | Coordinates | Parking lot zone | Floor | Parking lot | Car number | Usage |
|---|---|---|---|---|---|---|
| 1001 | (x1, y1, z1) | A1 | 1 | A | 001 | Used |

As shown in Table 2, a number of the self-driving car is 001, and the parking space used as the current position is: a parking space whose number is 1001 and whose coordinates are (x1, y1, z1) in a parking lot zone A1 on a floor 1 in a parking lot whose name is A. Because the parking space is used by the car whose car number is 001, usage of the parking space is "used". It should be noted that the coordinates (x1, y1, z1) may be coordinates predetermined for the parking space in the parking lot, or may be coordinates determined by the self-driving car by using a navigation system. This is not limited herein. In some embodiments, the self-driving car may obtain an allocated parking space and information about the parking space by exchanging information with a serving device in the parking lot or in another manner. This is not limited herein.

It should be noted that the parking lot in this embodiment refers to a place in which a special space is provided for car parking. In some embodiments, the parking lot may include a plurality of parking spaces, each of which is used by only one car at a time point.

It should be noted that the parking lot may be a public parking lot, a special-purpose parking lot, or a road parking lot. The public parking lot is a parking lot (outdoor or indoor) built according to urban planning and built as auxiliary facilities of public buildings for parking of social vehicles. The special-purpose parking lot is a parking lot built by an investor outside a road, is specially used for parking of cars of a unit and a residential district, and is generally not open to the public. In some embodiments, the special-purpose parking lot may be alternatively a free parking lot provided by a place of business nature such as a shopping mall or a hotel according to consumption of a customer. The road parking lot may also be known as a public parking zone, and is a parking lot that may be set only in non-rush hours in a road section (generally set in a disconnected road section) without affecting smooth traffic when a parking range and specified parking time are limited, and that needs to be adjusted with a change of municipal engineering construction and dynamic traffic.

302. The server uses the current position to update a parking space information base, so that the updated parking space information base indicates that usage of the current position is used.

In some embodiments, the server may have the parking space information base, the parking space information base may include at least one parking space and usage of each of the at least one parking space, and the usage is unused or used. In some embodiments, the parking space in the parking space information base may be a parking space that only serves the self-driving car, or a parking space that may serve both the self-driving car and a non-self-driving car. This is not limited herein. It should be noted that a parking space that may serve the self-driving car may be provided with a charging pile, so that a self-driving car using electric power may be charged at the same time when parked in the parking space. In some embodiments, the parking space in the parking space information base may be distributed in a whole town, city, province, or country, or even the whole world. This is not limited herein.

In some embodiments, the parking space in the parking space information base may be obtained from update input of background personnel of the server, or from data uploaded by serving devices of different parking lots. In some embodiments, the self-driving car sends the current position to the server when in the parking state. If the self-driving car is parked for a long time (such as 1 hour, to exclude a situation of waiting for a traffic light or refueling at a gas station), the server may determine that the parking position of the self-driving car is a parking space. In some embodiments, after entering the parking state, the self-driving car determines that the self-driving car is parked in a parking space in a parking lot, and when sending the current position to the server, the self-driving car informs the server that the self-driving car is currently parked in a parking space in a parking lot. The parking space information base may be alternatively obtained in another manner, which is not limited herein.

In some embodiments, not all self-driving cars are from a same manufacturer, and self-driving cars of different manufacturers may not accept a service of a same server. Therefore, the server described in this embodiment cannot serve all self-driving cars. If a self-driving car of another manufacturer is parked in a parking space, the self-driving car may not send a current position to the server described in this embodiment. Therefore, in this embodiment, servers of different manufacturers may share data, so that when a server of another manufacturer receives a current position sent by another self-driving car, the server described in this embodiment may obtain related information from the server of the another manufacturer, so as to accurately update the parking space information base in a timely manner.

In this embodiment, the parking space information base may include the usage of each of the at least one parking space, and the usage may be unused or used. It should be noted that if the current position is a parking space in a parking lot, when the self-driving car sends the current position to the server, the server may update the parking space information base, so that the updated parking space information base indicates that usage of the current position is used. For example, if the usage of the parking space corresponding to the current position is unused before, the usage is changed to used; and if the usage of the parking space corresponding to the current position is used before, the usage remains used. It should be noted that when the self-driving car is in the driving state, it indicates that the self-driving car is not parked in any parking space. Therefore, after the self-driving car sends the current position to the server, the server may use the current position to update the parking space information base.

In this embodiment, the server may serve both the self-driving car and a non-self-driving car. Therefore, either the self-driving car or the non-self-driving car may send a corresponding current position to the server. The parking space (except a parking space dedicated for the self-driving car) in the parking space information base may be used for both the self-driving car and the non-self-driving car. This is not limited herein.

Referring to Table 3, an example is used below for description.

TABLE 3

| Parking space number | Coordinates | Parking lot zone | Floor | Parking lot | Car number | Usage | Self-driving car or not |
|---|---|---|---|---|---|---|---|
| 1001 | (x1, y1, z1) | A1 | 1 | A | 001 | Used | Yes |
| 1002 | (x2, y2, z2) | A5 | 5 | A | — | Unused | — |
| 1003 | (x3, y3, z3) | A1 | 7 | C | 003 | Used | No |

As shown in Table 3, the server receives current positions respectively sent by cars whose car numbers are 001 (a self-driving car) and 003 (a non-self-driving car), and the current positions are respectively parking spaces whose parking space numbers are 1001 and 1003. Based on this, the server may update the parking space information base, so that usage of the parking spaces whose parking space numbers are 1001 and 1003 is used. Because a parking space whose parking space number is 1002 is not used by a car, usage of the parking space whose parking space number is 1002 is unused. In some embodiments, some parking spaces are temporarily not used by cars, but may be reserved by cars in a software application (app) or another channel (such as a telephone reservation). Therefore, usage of such a parking space may be used.

In some embodiments, a parking lot may have an intelligent management system. The intelligent management system is a set of network system built by using a computer, a network device, and a lane management device, to manage vehicle entry and exit of a parking lot, guide a vehicle flow in the parking lot, and collect parking fees. In some embodiments, the intelligent management system of the parking lot has information about a plurality of parking spaces and may send the information about the plurality of parking spaces to the server, so that the server stores the information about the plurality of parking spaces in the parking space information base. The intelligent management system may further implement dynamic and static comprehensive management on vehicle entry and exit and on-site vehicles by collecting and recording vehicle entry and exit records and on-site positions, record vehicle entry and exit information by using a proximity card, complete a toll collection policy by using management software, and implement functions such as toll account management and lane device control. In some embodiments, both an incoming vehicle owner and management personnel of the parking lot have a proximity card with private identification, which is used as personal identification. Only a card that passes system inspection and approval may be used to perform an operation (a management card) or enter or exit the parking lot (a parking card). When the card is swiped to enter the parking lot, a parking space may be automatically allocated, and information about the parking space sent by the intelligent management system is received. In some embodiments, the intelligent management system may send the information about the parking space to the server. This is not limited herein.

303. The self-driving car detects an ambient environment to determine whether a dangerous event occurs.

In this embodiment, the dangerous event may include a fire event, a flood event, and an earthquake event, and may further include another event, which is not limited herein. In this embodiment, a detection module may be built in the self-driving car. The detection module may include one or more types of sensors, configured to detect the ambient environment.

In some embodiments, the self-driving car detects the ambient environment by using an infrared sensor and/or a smoke sensor, to determine whether the fire event occurs. If the self-driving car determines occurrence of fire by using the smoke sensor, and/or determines a heat sensation by using the infrared sensor, the self-driving car may further determine a source direction of the heat sensation. When a concentration of sensed smoke reaches a preset concentration, and/or the heat sensation sensed by the infrared sensor reaches a preset heat degree, the occurrence of fire may be determined.

In some embodiments, the self-driving car detects the ambient environment by using a water surface contact sensor, to determine whether the flood event occurs. In some embodiments, the water surface contact sensor may be built in the car and is configured to turn off an engine or another component when water flows into the car, to prevent further damage. In some embodiments, the water surface contact sensor may be built in the self-driving car. When the self-driving car senses water inflow by using the water surface contact sensor, and a degree of the water inflow reaches a specific degree, occurrence of flood may be determined. It should be noted that the flood may be caused by a rainstorm, floodwater, a dike burst, or another reason, and details are not described herein.

In some embodiments, the self-driving car detects the ambient environment by using an angle sensor, to determine whether the earthquake event occurs. In this embodiment, the angle sensor such as a gyroscope may detect whether consistent shaking occurs in a current environment. If a degree of the shaking reaches a specific degree, occurrence of the earthquake event may be determined. It should be noted that the occurrence of the earthquake event has a process from a mild degree to a severe degree. When there is a mild earthquake such as a magnitude 2 earthquake, no damage is caused to a car body. When the earthquake reaches a degree of an earthquake disaster, damage may be caused to the car body. Therefore, in the process, there may be enough time to escape from a scene.

In some embodiments, the self-driving car may further receive a disaster warning by using a wireless network. When receiving the disaster warning, the self-driving car determines that a dangerous event occurs, and sends a danger alarm to the server. A manner is not limited herein, as long as the manner may be used to determine that the dangerous event occurs in the ambient environment.

In this embodiment, for the self-driving car, the ambient environment may be a circular zone with the self-driving car as a center and with a preset length as a radius or may be a zone of another shape (such as a square) with a preset size and with the self-driving car as a center. This is not limited herein. In some embodiments, if the self-driving car is in a parking lot, the ambient environment may be the parking lot, or a floor or a parking lot zone of the parking lot. This is not limited herein.

304. The self-driving car sends a danger alarm to the server when determining that the dangerous event occurs, where the danger alarm is used to indicate that the self-driving car detects the dangerous event.

In some embodiments, the danger alarm may indicate a type of the dangerous event, such as a fire event, a flood event, or an earthquake event, may indicate a danger degree of the dangerous event, and may further indicate information such as a place of the dangerous event and danger coverage. This is not limited herein.

In some embodiments, after receiving the danger alarm sent by the self-driving car, the server may set the current position of the self-driving car as a dangerous position or set a zone in which the current position is located as a dangerous zone. In some embodiments, if the current position is a parking space in a parking lot, the parking space corresponding to the current position may be set as a dangerous parking space, or several parking spaces near the parking space may be set as dangerous parking spaces, or the parking lot may be set as a dangerous parking lot, and in this case, all parking spaces in the parking lot are dangerous parking spaces. This is not limited herein.

In some embodiments, the server may further set a danger index, and may further set the type of the dangerous event. This is not limited herein. It should be noted that when the dangerous event already ends and the parking space or the parking lot is restored to safety, a setting of the dangerous position may be cancelled and restored to safety.

305. The server determines a safe position for the self-driving car, where the safe position is a position in which the dangerous event does not occur currently.

In some embodiments, the safe position may be a suburb or a parking space in a parking lot and is not limited herein. A case in which the safe position is a parking space in a parking lot is used as an example. In some embodiments, the server may determine, from the parking space information base, a parking space whose usage is unused in a parking lot with no dangerous event as the safe position. For example, the parking space information base includes at least one parking space and usage of each of the at least one parking space, and the usage is unused or used. Therefore, the server may first obtain a set of unused parking spaces according to a parking space whose usage is unused in the parking space information base. If the set of unused parking spaces includes not less than one parking space, the server determines one parking space from the set of unused parking spaces as the safe position. In some embodiments, if the set of unused parking spaces includes less than one parking space, the server may wait for a preset time until the set of unused parking spaces includes not less than one parking space or determine the safe position in another manner. This is not limited herein.

Referring to Table 4, an example is used below for description.

TABLE 4

| Parking space number | Coordinates | Parking lot zone | Floor | Parking lot | Car number | Usage | Dangerous or not |
|---|---|---|---|---|---|---|---|
| 1001 | (x7, y7, z7) | B3 | Basement level 2 | B | — | Unused | Yes |
| 1002 | (x8, y8, z8) | C3 | Basement level 3 | C | — | Unused | No |
| 1003 | (x9, y9, z9) | D1 | 1 | D | 102 | Used | No |
| 1004 | (x10, y10, z10) | D2 | 2 | D | — | Unused | No |

In the parking space information base, in four positions shown in Table 4, usage of a parking space whose parking space number is 1003 is used, usage of parking spaces whose parking space numbers are 1001, 1002, and 1004 is unused, but a dangerous event currently occurs in the parking space whose parking space number is 1001. Therefore, parking space numbers of parking spaces in the set of unused parking spaces may be obtained and are {1002, 1004}. Because the set of unused parking spaces includes not less than one parking space, the server may determine one parking space from the set of unused parking spaces as the safe position.

In some embodiments, after the set of unused parking spaces is determined, if the set of unused parking spaces includes more than one parking space, one parking space may be determined and selected as the safe position by considering some factors (such as a distance or time). In some embodiments, the server may separately calculate a distance from the current position to each parking space in the set of unused parking spaces, and then determine a parking space with a shortest distance from the current position in the set of unused parking spaces as the safe position. In some embodiments, the distance may be a linear distance or a driving distance, the linear distance is a length of a line segment with the two positions as endpoints, and the driving distance is a distance of a driving route of the self-driving car between the two positions.

The following uses the linear distance as an example for description. Assume that the coordinates of the current position of the self-driving car are (x0, y0, z0). It may be understood from Table 4 that there are two parking spaces as candidate safe positions, and coordinates of the two parking spaces are respectively (x8, y8, z8) and (x10, y10, z10). In this case, a linear distance from (x0, y0, z0) to either of (x8, y8, z8) and (x10, y10, z10) may be separately calculated, to separately obtain a linear distance from the current position of the self-driving car to either of (x8, y8, z8) and (x10, y10, z10):

$$\sqrt{(x8-x0)^2+(y8-y0)^2+(z8-z0)^2} \text{ and}$$

$$\sqrt{(x10-x0)^2+(y10-y0)^2+(z10-z0)^2}.$$

Then, a position with a shorter linear distance is selected as the safe position. If $\sqrt{(x8-x0)^2+(y8-y0)^2+(z8-z0)^2}$ is smaller, (x8, y8, z8) is selected as the safe position of the self-driving car; or otherwise, (x10, y10, z10) is selected as the safe position of the self-driving car. In some embodiments, if the two distances are the same (in some calculation methods, if a mantissa part is omitted from an obtained number, for example, 5700 is obtained after omission of mantissa from 5784.18, there is a high probability of obtaining same data), the driving distance may be used, or random selection may be performed. This is not limited herein.

In some embodiments, because a road condition may be complex, the linear distance may not be able to represent a distance that the self-driving car drives between the two positions. In this case, the driving distance may be used as a parameter. Assume that the coordinates of the current position of the self-driving car are (x0, y0, z0). It may be understood from Table 4 that there are two parking spaces as candidate safe positions, and coordinates of the two parking spaces are respectively (x8, y8, z8) and (x10, y10, z10). In this case, a driving route from (x0, y0, z0) to either of (x8, y8, z8) and (x10, y10, z10) may be first separately designed by using a navigation module. For example, the server may perform route planning based on the parking space information base with reference to information such as a map, to provide an optional driving route in which the self-driving car may drive, so that the self-driving car may select a proper driving route from the optional driving route according to a specific rule as an escape route. In some embodiments, the escape route includes a plurality of absolute coordinate points with a time sequence relationship, to instruct the self-driving car to successively pass through positions indicated by the plurality of absolute coordinate points, where a starting point of the escape route is the current position, and an ending point of the escape route is the safe position. After two driving routes are determined, distances of the two driving routes are separately calculated, to separately obtain a driving distance from the current position of the self-driving car to either of (x8, y8, z8) and (x10, y10, z10). Then, a parking space corresponding to a driving route with a shorter distance is determined as the safe position.

For example, a calculation method of the driving distance from the coordinates (x0, y0, z0) of the current position of the self-driving car to the point (x8, y8, z8) is used as an example. As shown in FIG. 3-2 (a schematic diagram of a driving route), the driving route from the point (x0, y0, z0) to the point (x8, y8, z8) may be first determined, and several points in the driving route are determined, for example, three points that are successively (x8-1, y8-1, z8-1), (x8-2, y8-2, z8-2), and (x8-3, y8-3, z8-3). In this case, the driving route from the point (x0, y0, z0) to the point (x8, y8, z8) needs to successively pass through (x8-1, y8-1, z8-1), (x8-2, y8-2, z8-2), and (x8-3, y8-3, z8-3). Therefore, a linear distance from the point (x0, y0, z0) to the point (x8-1, y8-1, z8-1), a linear distance from the point (x8-1, y8-1, z8-1) to the point (x8-2, y8-2, z8-2), and a linear distance from the point (x8-2, y8-2, z8-2) to the point (x8-3, y8-3, z8-3) need to be separately calculated, and then are added to obtain the driving distance from the point (x0, y0, z0) to the point (x8, y8, z8).

When a disaster occurs, a road may be very congested. In this case, the server obtains a current traffic situation, for example, whether there is a traffic jam, weather, and other reasons. If driving follows the driving route, the driving may take longer, resulting in a delay or a loss. Therefore, in some embodiments, a to-be-selected parking space may be determined according to a time length. Specifically, the server may obtain the current traffic situation, then calculate, according to the current traffic situation, a time length used for driving from the current position to each parking space in the set of unused parking spaces, and finally determine a parking space with a shortest time length used for driving from the current position to the parking space as the safe position.

For example, two driving routes from the coordinates (x0, y0, z0) of the current position of the self-driving car to either of (x8, y8, z8) and (x10, y10, z10) are separately calculated, time lengths required by the self-driving car to complete driving in the two driving routes are separately predicted according to the current traffic situation, and a parking space with a shorter time length is determined as the safe position.

It should be noted that because not all self-driving cars are from a same manufacturer, the server cannot obtain corresponding current positions from all self-driving cars or obtain parking space information of all parking lots. In some embodiments, servers of different manufacturers may share data, so that the server in this embodiment may obtain the corresponding current positions of all self-driving cars, thereby obtaining the parking space information of all parking lots. In this way, information accuracy is ensured, and a case in which a plurality of self-driving cars correspond to a same parking space is avoided.

306. The server sends an escape instruction to the self-driving car, where the escape instruction includes the safe position.

In some embodiments, after the safe position corresponding to the self-driving car is determined, usage of a parking space of the safe position may be set to used. In some embodiments, although the safe position corresponding to the self-driving car is determined, the self-driving car is not necessarily to be parked in the safe position. Therefore, the server may wait for the self-driving car to return a confirmation message, to confirm that the self-driving car is to be parked in the safe position; or send a confirmation request to the self-driving car and then wait for the self-driving car to return a confirmation message. When confirming that the self-driving car is to be parked in the safe position, the server may change the usage of the parking space corresponding to the safe position to used.

In some embodiments, the escape instruction may further include an escape route, and the escape route is used to indicate a driving route from the current position to the safe position to the self-driving car. A calculation method of the escape route is described in step 305, and details are not described herein.

307. The self-driving car drives to the safe position according to the escape instruction.

In some embodiments, after receiving the escape instruction, the self-driving car may drive to the safe position according to the escape instruction. In some embodiments, if the escape instruction includes the escape route, the self-driving car may use a self-driving function such as millimeter wave radar and laser radar to identify an obstacle around the self-driving car and implement driving to the safe position by following the escape route. If the escape instruction includes no escape route, the self-driving car may alternatively obtain a driving route from the current position to the safe position by using the navigation system. This is not limited herein.

The information processing methods in the embodiments are described above, and a server in an embodiment is described below.

Figure 4:
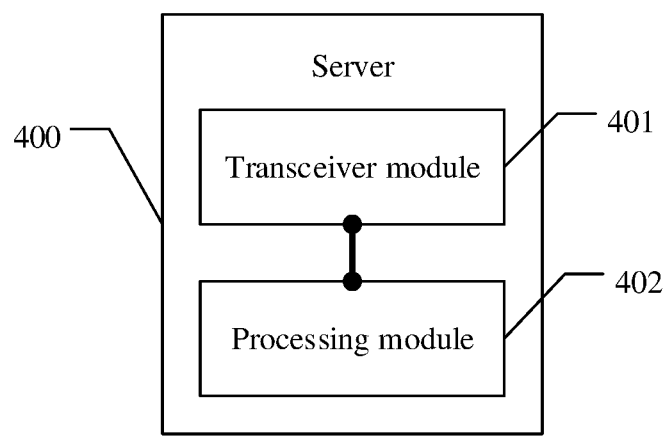
FIG. 4 is a schematic diagram of a server according to an embodiment.

Referring to FIG. 4, an embodiment provides a server 400, including:

a transceiver module 401, configured to receive a danger alarm sent by an intelligent mobile robot, where the danger alarm is used to indicate that the intelligent mobile robot detects a dangerous event; and a processing module 402, configured to determine a safe position for the intelligent mobile robot, where the safe position is a position in which the dangerous event does not occur currently, and the transceiver module is further configured to send an escape instruction to the intelligent mobile robot, where the escape instruction includes the safe position.

The intelligent mobile robot may drive to the safe position according to the escape instruction. Therefore, the intelligent mobile robot may stay away from the dangerous event and reduce a risk of being damaged.

In some embodiments, the transceiver module 401 is further configured to receive a current position of the intelligent mobile robot sent by the intelligent mobile robot. It should be noted that the escape instruction further includes an escape route, and the escape route is used to indicate a driving route from the current position to the safe position to the intelligent mobile robot.

The intelligent mobile robot is enabled to have a definite driving route. Therefore, the intelligent mobile robot may follow the driving route to drive to the safe position, so as to escape from a danger.

In some embodiments, the processing module 402 is configured to:

if the intelligent mobile robot is a self-driving car, determine the safe position for the intelligent mobile robot according to a parking space information base, where the parking space information base includes at least one parking space and usage of each of the at least one parking space, the usage is unused or used, and the safe position is a parking space whose usage is unused in the parking space information base.

Due to obtaining of the parking space information base and management of the parking space information base, the safe position is determined, so that the intelligent mobile robot may drive to the safe position when encountering a danger.

In some embodiments, in a step of determining the safe position for the intelligent mobile robot according to the parking space information base, the processing module 402 performs at least the following steps:

determining, according to the parking space information base, a parking space whose usage is unused, to obtain a set of unused parking spaces; and if the set of unused parking spaces includes not less than one parking space, determining one parking space from the set of unused parking spaces as the safe position.

In some embodiments, in a step of determining one parking space from the set of unused parking spaces as the safe position, the processing module 402 performs at least the following steps:

if the set of unused parking spaces includes more than one parking space, separately calculating a distance from the current position to each parking space in the set of unused parking spaces; and determining a parking space with a shortest distance from the current position in the set of unused parking spaces as the safe position.

The safe position may be effectively determined based on the distance between the current position and the parking space.

In some embodiments, in a step of determining one parking space from the set of unused parking spaces as the safe position, the processing module 402 performs at least the following steps:

obtaining a current traffic situation if the set of unused parking spaces includes more than one parking space;

calculating, according to the current traffic situation, a time length used for driving from the current position to each parking space in the set of unused parking spaces; and determining a parking space with a shortest time length used for driving from the current position to the parking space as the safe position.

The safe position may be effectively determined based on the time length of driving between the current position and the parking space.

In some embodiments, the processing module 402 is further configured to change, in the parking space information base, usage of the safe position to used. Therefore, the parking space information base may be updated in a timely manner, so that the parking space information base provides more accurate information and better use experience.

In some embodiments, the processing module 402 is further configured to: if the current position is a parking space in the parking space information base, use the current position to update the parking space information base, so that the updated parking space information base indicates that usage of the parking space corresponding to the current position is used. Therefore, the parking space information base may be updated in a timely manner, so that the parking space information base provides more accurate information and better use experience.

The server in the embodiment is described above, and an intelligent mobile robot in an embodiment is described below.

Figure 5:
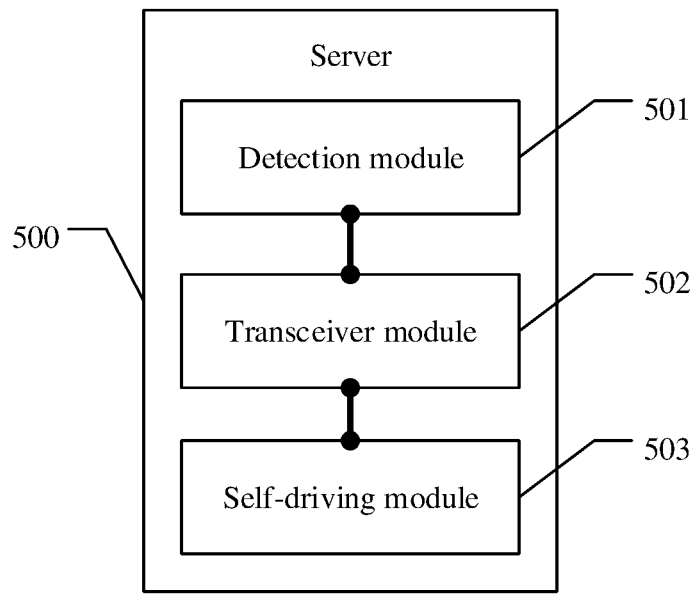
FIG. 5 is a schematic diagram of an intelligent mobile robot according to an embodiment.

Referring to FIG. 5, an embodiment provides an intelligent mobile robot 500, including:

a detection module 501, configured to detect an ambient environment to determine whether a dangerous event occurs; and a transceiver module 502, configured to send a danger alarm to a server when that the dangerous event occurs is determined, where the danger alarm is used to indicate that the detection module detects the dangerous event, so that the server determines a safe position for the intelligent mobile robot, where the safe position is a position in which the dangerous event does not occur currently.

The transceiver module 502 is further configured to receive an escape instruction sent by the server, where the escape instruction includes the safe position. Therefore, the intelligent mobile robot may drive to the safe position according to the escape instruction, so as to stay away from the dangerous event and reduce a risk of being damaged.

In some embodiments, the intelligent mobile robot 500 further includes:

a self-driving module 503, configured to drive to the safe position according to the escape instruction, so as to stay away from the dangerous event and reduce a risk of being damaged.

In some embodiments, the transceiver module 502 is further configured to send a current position of the intelligent mobile robot to the server.

It should be noted that the escape instruction further includes an escape route, and the escape route is used to indicate a driving route from the current position to the safe position to the intelligent mobile robot 500. Based on a definite driving route, the intelligent mobile robot 500 may follow the driving route to drive to the safe position, so as to escape from a danger.

In some embodiments, the detection module 501 is configured to:

detect the ambient environment by using an infrared sensor and/or a smoke sensor, to determine whether a fire event occurs;

detect the ambient environment by using a water surface contact sensor, to determine whether a flood event occurs; and/or detect the ambient environment by using an angle sensor, to determine whether an earthquake event occurs.

In this embodiment, when the dangerous event occurs, the intelligent mobile robot may send the danger alarm to the server. The server may determine, for the intelligent mobile robot, the safe position in which the dangerous event does not occur currently, and send the escape instruction including the safe position to the intelligent mobile robot. Therefore, the intelligent mobile robot may drive to the safe position according to the escape instruction, so as to stay away from the dangerous event and reduce a risk of being damaged.

Figure 6:
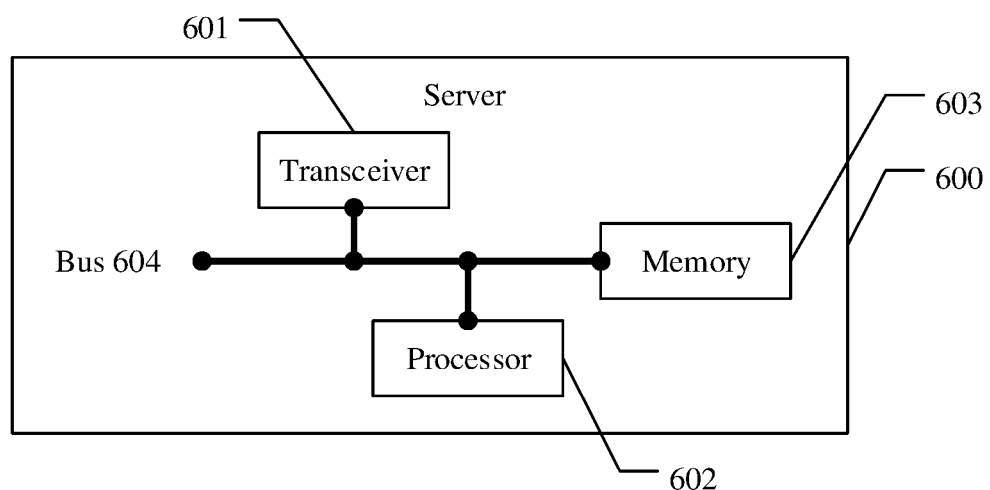
FIG. 6 is a schematic diagram of a server according to an embodiment.

Referring to FIG. 6, an embodiment further provides a server 600, including a transceiver 601, a processor 602, and a memory 603.

The transceiver 601, the processor 602, and the memory 603 are connected by using a bus 604.

The transceiver 601 is configured to receive a danger alarm sent by an intelligent mobile robot, where the danger alarm is used to indicate that the intelligent mobile robot detects a dangerous event.

The memory 603 is configured to store a program, and the processor 602 calls the program stored in the memory, to determine a safe position for the intelligent mobile robot, where the safe position is a position in which the dangerous event does not occur currently.

The transceiver 601 is further configured to send an escape instruction to the intelligent mobile robot, where the escape instruction includes the safe position.

Figure 7:
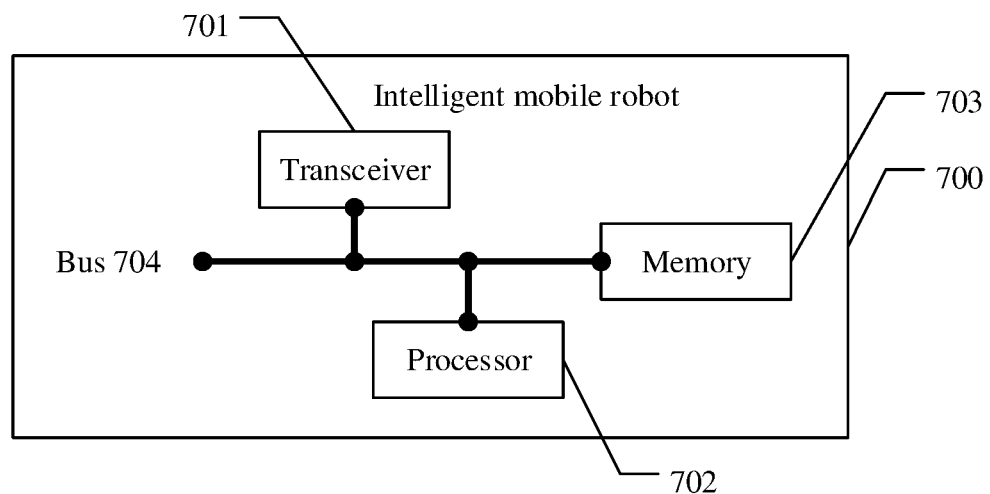
FIG. 7 is a schematic diagram of an intelligent mobile robot according to an embodiment.

Referring to FIG. 7, an embodiment further provides an intelligent mobile robot 700, including a transceiver 701, a processor 702, and a memory 703.

The transceiver 701, the processor 702, and the memory 703 are connected by using a bus 704.

The memory 703 is configured to store a program, and the processor 702 calls the program stored in the memory, to detect an ambient environment to determine whether a dangerous event occurs.

The transceiver 701 is further configured to send a danger alarm to a server when that the dangerous event occurs is determined, where the danger alarm is used to indicate that the intelligent mobile robot detects the dangerous event, so that the server determines a safe position for the intelligent mobile robot, where the safe position is a position in which the dangerous event does not occur currently; and receive an escape instruction sent by the server, where the escape instruction includes the safe position.

It should be noted that the transceiver 601/701 includes one or any combination of ZigBee, Wi-Fi, LTE (long term evolution), RFID (radio frequency identification), NFC (near field communication), infrared, and UWB (ultra wideband), which is not limited herein; or may include a communications interface in an EIA-RS-232C standard, that is, a communications interface in a serial binary data exchange interface technology standard between data terminal equipment (DTE) and data circuit-terminating equipment (DCE); or may include a communications interface in an RS-485 protocol, which is not limited herein.

The processor 602/702 may be a central processing unit (CPU), a network processor (NP), or a combination of a CPU and an NP.

The processor 602/702 may further include a hardware chip. The foregoing hardware chip may be an application-specific integrated circuit (ASIC), a programmable logic device (PLD), or any combination thereof. The PLD may be a complex programmable logical device (CPLD), a field programmable gate array (FPGA), generic array logic (GAL), or any combination thereof.

The memory 603/703 may include a volatile memory, for example, a random access memory (RAM). Alternatively, the memory 603/703 may include a nonvolatile memory, for example, a flash memory, a hard disk drive (HDD), or a solid state disk (SSD). Alternatively, the memory 603/703 may include any combination of the foregoing types of memories. This is not limited herein.

Optionally, the memory 603/703 may be further configured to store a program instruction. The processor 602/702 may call the program instruction stored in the memory 603/703, to perform one or more steps or optional implementations in the embodiment shown in FIG. 2 or FIG. 3.

Optionally, an embodiment provides a chip system. The chip system includes a processor, configured to support a server or an intelligent mobile robot in implementing the foregoing information processing method. In a possible implementation, the chip system further includes a memory. The memory is configured to store a program instruction and data that are necessary for the server or the intelligent mobile robot. The chip system may include a chip, or may include a chip and other discrete components. This is not limited in this embodiment.

In this embodiment, when a dangerous event occurs, the intelligent mobile robot may send a danger alarm to the server. The server may determine, for the intelligent mobile robot, a safe position in which the dangerous event does not occur currently, and send an escape instruction including the safe position to the intelligent mobile robot. Therefore, the intelligent mobile robot may drive to the safe position according to the escape instruction, so as to stay away from the dangerous event and reduce a risk of being damaged.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedures or functions according to the embodiments are all or partially generated. The computer may be a general-purpose computer, a dedicated computer, a computer network, or other programmable apparatuses. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

The foregoing embodiments further provide a chip, including a processing unit and a storage unit. The storage unit is configured to store a computer operation instruction, and the processing unit is configured to call the computer operation instruction to perform the information processing method described in the foregoing method steps.

It may be understood by persons of ordinary skill in the art that, for the purpose of convenient and brief description, for a detailed working process of the foregoing system, apparatus, and unit, refer to a corresponding process in the foregoing method embodiments, and details are not described herein.

In the several embodiments provided, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the solutions of the embodiments essentially, or the part contributing to the prior art, or all or some of the solutions may be implemented in the form of a software product. The computer software product is stored in a storage medium and includes several instructions for instructing a computer device (which may be a personal computer, a server, or a network device) to perform all or some of the steps of the methods described in the embodiments. The foregoing storage medium includes any medium that can store program code, such as a USB flash drive, a removable hard disk, a read-only memory (ROM), a random access memory RAM, a magnetic disk, or an optical disc.

The foregoing embodiments are merely intended for describing the solutions, but are not limiting. Persons of ordinary skill in the art should understand that they may still make modifications to the solutions described in the foregoing embodiments or make equivalent replacements to some features thereof, without departing from the spirit and scope of the solutions of the embodiments.

What is claimed is:

1. An information processing method, comprising:
   receiving, by a server, a danger alarm sent by an intelligent mobile robot, wherein the danger alarm is used to indicate that the intelligent mobile robot detects a dangerous event, the dangerous event associated with an area encompassing a current position of the intelligent mobile robot;
   determining, by the server, a safe position for the intelligent mobile robot, wherein the safe position is a position in which the dangerous event is not currently occurring and which is associated with a reduced risk of damage to the intelligent mobile robot; and
   sending, by the server, an escape instruction to the intelligent mobile robot, wherein the escape instruction comprises the safe position.

2. The method according to claim 1, wherein, before the receiving, by a server, of the danger alarm sent by an intelligent mobile robot, the method further comprises:
   receiving, by the server, the current position of the intelligent mobile robot sent by the intelligent mobile robot, wherein
   the escape instruction further comprises an escape route, and the escape route is used to indicate a driving route from the current position to the safe position to the intelligent mobile robot.

3. The method according to claim 1, wherein the intelligent mobile robot comprises a self-driving car and a self-flying unmanned aerial vehicle.

4. The method according to claim 3, wherein the determining, by the server, of the safe position for the intelligent mobile robot comprises:
   if the intelligent mobile robot is the self-driving car, determining, by the server, the safe position for the intelligent mobile robot according to a parking space information base, wherein the parking space information base comprises at least one parking space and usage of each of the at least one parking space, the usage is unused or used, and the safe position is a parking space whose usage is unused in the parking space information base.

5. The method according to claim 4, wherein the determining, by the server, of the safe position for the intelligent mobile robot according to parking space information comprises:
   determining, by the server according to the parking space information base, a parking space whose usage is unused, to obtain a set of unused parking spaces; and
   if the set of unused parking spaces comprises not less than one parking space, determining, by the server, one parking space from the set of unused parking spaces as the safe position.

6. The method according to claim 5, wherein the determining, by the server, of one parking space from the set of unused parking spaces as the safe position comprises:
   if the set of unused parking spaces comprises more than one parking space, separately calculating, by the server, a distance from the current position to each parking space in the set of unused parking spaces; and
   determining, by the server, a parking space with a shortest distance from the current position in the set of unused parking spaces as the safe position.

7. The method according to claim 6, wherein the distance is a linear distance or a driving distance, the linear distance is a length of a line segment with the two positions as endpoints, and the driving distance is a distance of a driving route of the intelligent mobile robot between the two positions.

8. The method according to claim 5, wherein the determining, by the server, of one parking space from the set of unused parking spaces as the safe position comprises:
   obtaining, by the server, a current traffic situation if the set of unused parking spaces comprises more than one parking space;
   calculating, by the server according to the current traffic situation, a time length used for driving from the current position to each parking space in the set of unused parking spaces; and
   determining, by the server, a parking space with a shortest time length used for driving from the current position to the parking space as the safe position.

9. The method according to claim 4, wherein, after the sending, by the server, an escape instruction to the intelligent mobile robot, the method further comprises:
   changing, by the server in the parking space information base, usage of the safe position to used.

10. The method according to claim 4, wherein after the receiving, by the server, of the current position of the intelligent mobile robot sent by the intelligent mobile robot, the method further comprises:
    if the current position is a parking space in the parking space information base, using, by the server, the current position to update the parking space information base, so that the updated parking space information base indicates that usage of the parking space corresponding to the current position is used.

11. The method according to claim 4, wherein the safe position is a parking space in a parking lot, and/or the current position is a parking space in a parking lot.

12. The method according to claim 1, wherein the dangerous event comprises a fire event, a flood event, and an earthquake event.

13. A server, comprising:
a transceiver module configured to receive a danger alarm sent by an intelligent mobile robot, wherein the danger alarm is used to indicate that the intelligent mobile robot detects a dangerous event, the dangerous event associated with an area encompassing a current position of the intelligent mobile robot; and
a processing module configured to determine a safe position for the intelligent mobile robot, wherein the safe position is a position in which the dangerous event does not occur currently and which is associated with a reduced risk of damage to the intelligent mobile robot, wherein
the transceiver module is further configured to send an escape instruction to the intelligent mobile robot, wherein the escape instruction comprises the safe position.

14. The server according to claim 13, wherein
the transceiver module is further configured to receive the current position of the intelligent mobile robot sent by the intelligent mobile robot, wherein
the escape instruction further comprises an escape route, and the escape route is used to indicate a driving route from the current position to the safe position to the intelligent mobile robot.

15. The server according to claim 13, wherein the processing module is configured to:
if the intelligent mobile robot is a self-driving car, determine the safe position for the intelligent mobile robot according to a parking space information base, wherein the parking space information base comprises at least one parking space and usage of each of the at least one parking space, the usage is unused or used, and the safe position is a parking space whose usage is unused in the parking space information base.

16. The server according to claim 15, wherein in the step of determining the safe position for the intelligent mobile robot according to the parking space information base, the processing module performs at least the following steps:

determining, according to the parking space information base, a parking space whose usage is unused, to obtain a set of unused parking spaces; and
if the set of unused parking spaces comprises not less than one parking space, determining one parking space from the set of unused parking spaces as the safe position.

17. The server according to claim 16, wherein in the step of determining one parking space from the set of unused parking spaces as the safe position, the processing module performs at least the following steps:
if the set of unused parking spaces comprises more than one parking space, separately calculating a distance from the current position to each parking space in the set of unused parking spaces; and
determining a parking space with a shortest distance from the current position in the set of unused parking spaces as the safe position.

18. The server according to claim 17, wherein in the step of determining one parking space from the set of unused parking spaces as the safe position, the processing module performs at least the following steps:
obtaining a current traffic situation if the set of unused parking spaces comprises more than one parking space;
calculating, according to the current traffic situation, a time length used for driving from the current position to each parking space in the set of unused parking spaces; and
determining a parking space with a shortest time length used for driving from the current position to the parking space as the safe position.

19. The server according to claim 16, wherein
the processing module is further configured to change, in the parking space information base, usage of the safe position to used.

20. The server according to claim 16, wherein
the processing module is further configured to: if the current position is a parking space in the parking space information base, use the current position to update the parking space information base, so that the updated parking space information base indicates that usage of the parking space corresponding to the current position is used.

* * * * *